US010623130B2

(12) United States Patent
Skertic (10) Patent No.: US 10,623,130 B2
(45) Date of Patent: Apr. 14, 2020

(54) DETERMINING A FREQUENCY FOR PROPULSOR ENGINE COMMUNICATION SESSIONS (71) Applicant: Rolls-Royce North American Technologies, Inc., Indianapolis, IN (US)

(72) Inventor: Richard Joseph Skertic, Carmel, IN (US)

(73) Assignee: Rolls-Royce North American Technologes, Inc., Indianapolis, IN (US)

( * ) Notice: Subject to any disclaimer, the term of this patent is extended or adjusted under 35 U.S.C. 154(b) by 246 days.

(21) Appl. No.: 15/662,075

(22) Filed: Jul. 27, 2017

(65) Prior Publication Data
US 2019/0036638 A1 Jan. 31, 2019

(51) Int. Cl.
*H04L 29/06* (2006.01)
*H04K 1/00* (2006.01)
(Continued)

(52) U.S. Cl.
CPC .............. *H04K 1/003* (2013.01); *H04K 3/25* (2013.01); *H04K 3/827* (2013.01); *H04L 63/04* (2013.01);
(Continued)

(58) Field of Classification Search
CPC ... H04L 63/04; H04L 63/0428; H04L 63/068; H04L 63/1441; H04L 9/0861;
(Continued)

(56) References Cited

U.S. PATENT DOCUMENTS

| 4,276,652 A | 6/1981 | McCalmont et al. |
| 6,359,558 B1 | 3/2002 | Tsui |

(Continued)

FOREIGN PATENT DOCUMENTS

SG 183884 A1 4/2011

OTHER PUBLICATIONS

Flight Mechanic "Full Authority Digital Electronic Control (FADEC) in Engine Fuel and Fuel Metering Systems" [Online], Jan. 20, 2017 [Retrieved on: Jun. 9, 2019], www.flight-mechanic.com, Retrieved from: < http://www.flight-mechanic.com/full-authority-digital-electronic-control-fadec/> (Year: 2017).*

(Continued)

*Primary Examiner* — Eric W Shepperd
(74) *Attorney, Agent, or Firm* — Shumaker & Sieffert, P.A.

(57) ABSTRACT

In some examples, a system includes a propulsor engine and a controller configured to determine a frequency for a new communication session on a communication channel based on a frequency of a previous communication session, wherein the frequency for the new communication session is different than the frequency of the previous communication session. In some examples, the controller is further configured to establish the new communication session via the communication channel with the propulsor engine. In some examples, the controller is also configured to exchange information with the propulsor engine at the frequency for the new communication session via the communication channel.

20 Claims, 4 Drawing Sheets (51) Int. Cl.
  *H04K 3/00* (2006.01)
  *H04L 9/08* (2006.01)
  *B63H 21/21* (2006.01)
  *B64D 31/00* (2006.01)
(52) U.S. Cl.
  CPC ...... *H04L 63/0428* (2013.01); *H04L 63/1441* (2013.01); *B63H 21/21* (2013.01); *B64D 31/00* (2013.01); *H04K 2203/22* (2013.01); *H04L 9/0869* (2013.01)
(58) Field of Classification Search
  CPC ........ H04L 9/0869; H04K 1/003; H04K 3/25; H04K 2203/22; B63H 21/21; B64D 31/00; B64D 31/14
  See application file for complete search history.

(56) References Cited

U.S. PATENT DOCUMENTS

| | | | |
|---|---|---|---|
| 6,362,768 B1* | 3/2002 | Younis | G06F 13/4072 341/120 |
| 7,418,205 B2 | 8/2008 | Litvin | |
| 7,689,394 B2* | 3/2010 | Furem | E02F 9/2054 703/8 |
| 7,961,091 B2 | 6/2011 | Edwards et al. | |
| 8,183,980 B2 | 5/2012 | Davis et al. | |
| 8,290,683 B2* | 10/2012 | Luppold | F02C 9/42 340/945 |
| 8,351,454 B2 | 1/2013 | Jain et al. | |
| 8,358,613 B1* | 1/2013 | Giallorenzi | H04W 12/02 370/328 |
| 8,565,998 B2* | 10/2013 | Brown | F02C 9/00 701/100 |
| 8,970,345 B2 | 3/2015 | Carlson et al. | |
| 9,124,580 B1 | 9/2015 | Sampigethaya | |
| 9,178,897 B2 | 11/2015 | Bush et al. | |
| 9,253,003 B1 | 2/2016 | Harel | |
| 9,584,542 B2 | 2/2017 | Kim et al. | |
| 9,616,828 B2 | 4/2017 | Ben Noon et al. | |
| 2005/0096873 A1* | 5/2005 | Klein | G01H 1/006 702/184 |
| 2005/0272434 A1* | 12/2005 | Choi | H04B 1/715 455/450 |
| 2007/0010201 A1* | 1/2007 | Grundvig | H04W 28/18 455/41.2 |
| 2009/0003413 A1* | 1/2009 | Jang | H04B 1/715 375/135 |
| 2009/0201099 A1* | 8/2009 | Kemmochi | H04B 1/0057 333/126 |
| 2010/0057957 A1* | 3/2010 | Smilg | G05B 19/042 710/104 |
| 2010/0098243 A1* | 4/2010 | Chopart | G06F 21/31 380/28 |
| 2011/0230137 A1* | 9/2011 | Hicks | H04L 12/2838 455/41.2 |
| 2012/0302155 A1* | 11/2012 | Marsolais | H04K 1/003 455/1 |
| 2013/0013905 A1* | 1/2013 | Held | G06F 21/575 713/2 |
| 2013/0076523 A1* | 3/2013 | Kwan | A61B 5/0022 340/686.6 |
| 2014/0013782 A1* | 1/2014 | Kopko | A63B 57/00 62/115 |
| 2014/0306814 A1* | 10/2014 | Ricci | H04W 4/21 340/425.5 |
| 2014/0354293 A1* | 12/2014 | Wong | G01R 31/08 324/520 |
| 2015/0363981 A1 | 12/2015 | Ziarno et al. | |
| 2015/0364033 A1* | 12/2015 | Witkowski | G08C 17/02 340/5.25 |
| 2016/0198310 A1* | 7/2016 | Chalmers | H04W 4/046 455/456.1 |
| 2016/0347326 A1* | 12/2016 | Iwagami | B60W 10/06 |
| 2016/0374497 A1* | 12/2016 | McCarthy | A47H 5/06 160/310 |
| 2017/0114697 A1* | 4/2017 | Zambrano | F02D 41/08 |
| 2017/0127383 A1 | 5/2017 | Tang | |
| 2017/0142619 A1* | 5/2017 | Petrick | H04W 36/0055 |
| 2017/0291593 A1* | 10/2017 | Iwagami | F02D 41/0215 |
| 2018/0110030 A1* | 4/2018 | Stevenson | H04W 72/02 |

OTHER PUBLICATIONS

Khan et al. "Experimental Study of Full Authority Digital Engine Control (FADEC) System on Lycoming Engine" [Online], Dec. 2013 [Retrieved on: Jun. 9, 2019], www.ijmer.com, IJMER vol. 3, Issue. 6, Retrieved from: < http://www.ijmer.com/papers/Vol3_Issue6/BQ3635913603.pdf > (Year: 2013).*
Extended Search Report from counterpart European Application No. 18180082.2, dated Oct. 31, 2018, 10 pp.
Wikipedia, "Garage door opener", Retrieved on May 23, 2017 from https://en.wikipedia.org/wiki/Garage_door_opener, 6 pgs.
Response to communication pursuant to Rules 69 and 70a(1) EPC dated Feb. 4, 2019 from counterpart European Application No. 18180082.2, filed Jul. 29, 2019, 7 pp.
Communication pursuant to Article 94(3) EPC from counterpart European Application No. 18180082.2, dated Sep. 2, 2019, 10 pp.
Response to Examination Report dated Sep. 2, 2019, from counterpart European Application No. 18180082.2 filed Jan. 13, 2020, 70 pp.

* cited by examiner

DETERMINING A FREQUENCY FOR PROPULSOR ENGINE COMMUNICATION SESSIONS

TECHNICAL FIELD

This disclosure relates to control systems for propulsor engines.

BACKGROUND

A propulsor engine (e.g., of a vehicle system) may include a controller configured to control the operations of the propulsor engine, and in some cases, the operations of components, such as sensors, actuators, and data collection devices, associated with the propulsor engine. The controller may communicate with the propulsor engine and the components by transmitting control signals on an open, unsecure communication channel. If an attacker or other such unauthorized user knows the frequency of the communication channel, the attacker may be able to snoop on or even interfere with the control signals being sent via the communication channel thereby potentially impacting the operations of the propulsor engine and the components of the propulsor engine.

SUMMARY

In some examples, the disclosure describes a system includes a propulsor engine and a controller configured to determine a frequency for a new communication session on a communication channel based on a frequency of a previous communication session, wherein the frequency for the new communication session is different than the frequency of the previous communication session. The controller is further configured to establish the new communication session via the communication channel with the propulsor engine. The controller is also configured to exchange information with the propulsor engine at the frequency for the new communication session via the communication channel.

In some examples, the disclosure describes a method including determining a frequency for a new communication session on a communication channel based on a frequency of a previous communication session, wherein the frequency for the new communication session is different than the frequency of the previous communication session. The method further includes establishing the new communication session via the communication channel with a propulsor engine. The method also includes exchanging information with the propulsor engine at the frequency for the new communication session via the communication channel.

In some examples, the disclosure describes a system including a propulsor engine, a component, and a controller configured to exchange information with the propulsor engine during a first previous communication session via a first communication channel. The controller is further configured to exchange information with the component during a second previous communication session via a second communication channel. The controller is also configured to power off the propulsor engine after exchanging information with the propulsor engine during the first previous communication session and after exchanging information with the component during the second previous communication session. The controller is configured to power on the propulsor engine after powering off the propulsor engine and determine a frequency for the first new communication session on the first communication channel based on a frequency of a first previous communication session, wherein the frequency for the first new communication session is different than the frequency of the first previous communication session. The controller is further configured to determine a frequency for the second new communication session on the second communication channel based on a frequency of a second previous communication session, wherein the frequency for the second new communication session is different than the frequency of the second previous communication session. The controller is also configured to exchange information with the propulsor engine at the frequency for the first new communication session via the first communication channel and exchange information with the component at the frequency for the second new communication session via the second communication channel.

The details of one or more examples are set forth in the accompanying drawings and the description below. Other features, objects, and advantages will be apparent from the description and drawings, and from the claims.

DETAILED DESCRIPTION

In general, this disclosure describes techniques for establishing secure communication channels between a controller of a propulsor engine and components of the propulsor engine (including internal and external or auxiliary components of the propulsor engine) by changing the frequency that is used for each communication session between the controller and the components of the propulsor engine (e.g., each time the propulsor engine is powered-on, or at other suitable times). The controller and the components of the propulsor engine may be configured to exchange information via a communication channel, such as a wired connection and/or a wireless connection. The controller may be configured to determine the frequency for a new communication session that is different from, but based on, the frequency used for a previous communication session.

In this way, if an attacker or other such unauthorized user knows the frequency of a previous communication session, the techniques of this disclosure may enable the controller to prevent the attacker from snooping on or interfering with a new or current communication session. In other words, the attacker may be unable to snoop on or interfere with the information being exchanged between the controller and the propulsor engine because the controller will have changed the frequency for the current communication session so that the frequency is based on, but different than the frequency of the previous communication session.

Figure 1:
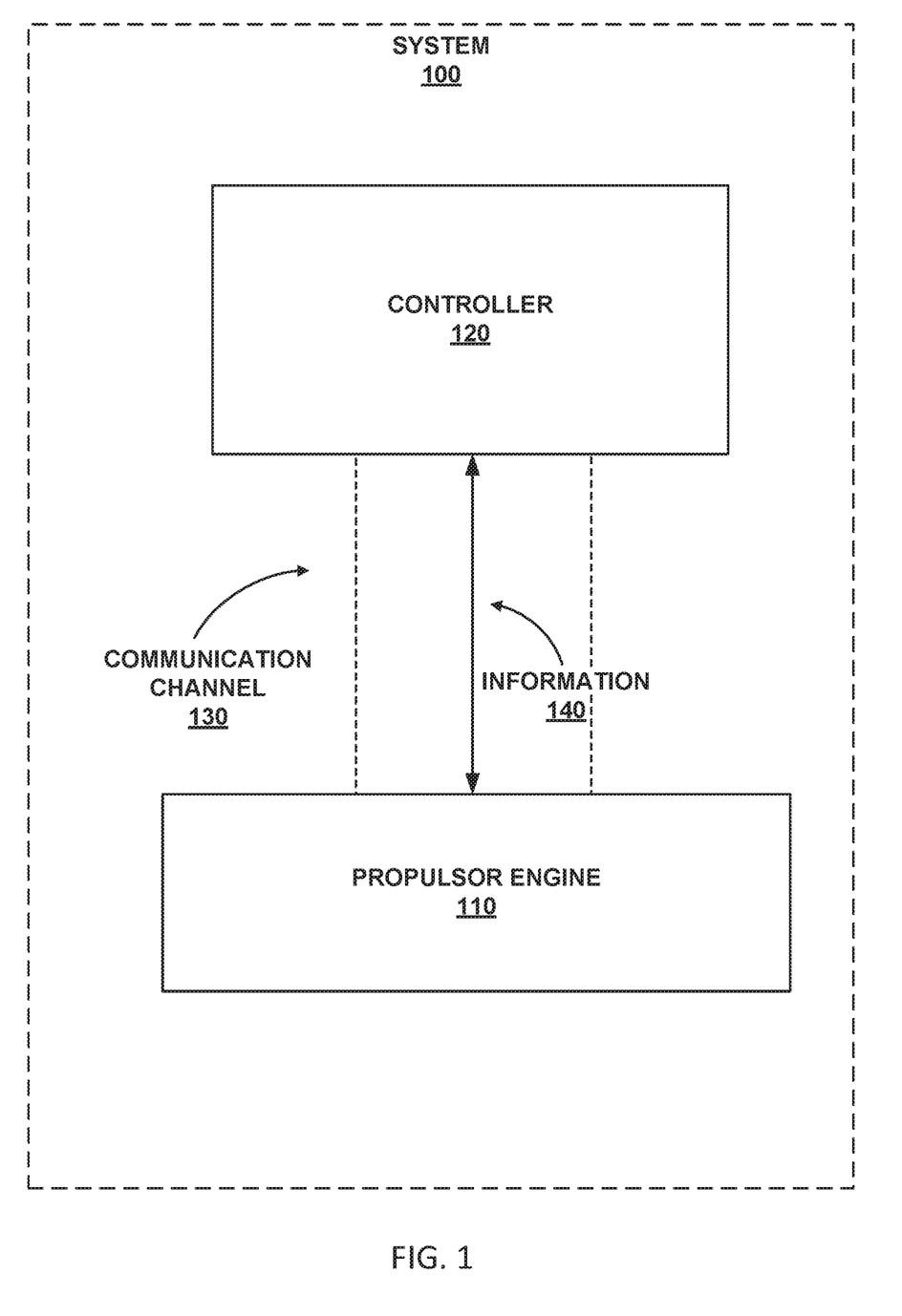
FIG. 1 is a conceptual block diagram illustrating a controller configured to control operations of a propulsor engine, in accordance with one or more techniques of this disclosure.

FIG. 1 is a conceptual block diagram illustrating a controller 120 configured to control operations of a propulsor engine 110, in accordance with one or more techniques of this disclosure. In some examples, system 100 may include additional propulsor engines additional controllers, and/or one or more components of the propulsor engines. In some examples, a single controller (e.g., controller 120) may be configured to control operations of multiple propulsor engines and multiple components, or system 100 may include more than one controller. The propulsion created by propulsor engine 110 may be used in a variety of ways or for a variety of systems and applications (e.g., aircraft, locomotives, marine craft, power plants, electric generators, and any or all other systems and applications that rely on mechanical energy from a propulsor engine to perform work).

Propulsor engine 110 may be configured to generate propulsion by converting fuel or electrical power to mechanical power. Propulsor engine 110 may be configured to periodically power on to generate propulsion and power off between operations. In some examples, propulsor engine 110 may include one or more internal components, such as an interface for exchanging information with controller 120, a memory device configured to store information exchanged with controller 120, and/or other components that are not shown in FIG. 1. In some examples, propulsor engine 110 may include a turbine, a shaft, a compressor, a combustor, a generator, and/or any other internal components for generating propulsion and/or electricity. Propulsor engine 110 may be a gas turbine engine, a nuclear turbine engine, a steam turbine engine, internal combustion engine, Wankel engine, diesel engine, rotary engine, and/or any other suitable propulsor engine.

In some examples, system 100 is a vehicle, and propulsor engine 110 and controller 120 may be mounted on or within the vehicle. For example, propulsor engine 110 may include a turbine engine mounted as a center engine on an aircraft, a marine vehicle, or a tank. In some examples, propulsor engine 110 may include a turbine engine mounted on a wing of an aircraft or a marine vehicle. If the vehicle includes more than one propulsor engine, controller 120 may be a central controller configured to control the operations of all of the propulsor engines mounted on the vehicle, or controller 120 may be configured to control the operations of only propulsor engine 110.

Controller 120 may be configured to determine a frequency for the new communication session through communication channel 130 based on a frequency of a previous communication session. For example, controller 120 may be configured to determine the frequency for the new communication session based on an algorithm. In some examples, controller 120 may be configured to choose a seed to input in the algorithm. Controller 120 may be configured to transmit the chosen seed to propulsor engine 110 at the beginning of the new communication session, and propulsor engine 110 may be configured to determine the new frequency based on the seed and the algorithm.

Controller 120 may be configured to establish a communication session via communication channel 130 with components of propulsor engine 110. In some examples, controller 120 may be configured to establish a new communication session when propulsor engine 110 powers on. In some examples, controller 120 may be configured to power on propulsor engine 110 by controlling a starting device to initiate the operation of propulsor engine 110. Controller 120 may be configured to initiate the new communication session at a new frequency determined by controller 120. In some examples, controller may be configured to initiate the new communication session at the frequency of a previous communication session before controller 120 determines a new frequency. Controller 120 may also be configured to terminate or conclude the communication session when propulsor engine 110 powers off.

In some examples, controller 120 may be configured to cycle through a set list of frequencies that is stored to a memory device. Controller 120 may be configured to iterate through the set list for each communication session. For example, an entry on the set list for the frequency for the new communication session may immediately follow the entry for the frequency of the previous communication session. In some examples, propulsor engine 110 may be configured to store the algorithm and/or set list so that propulsor engine 110 may decode the information transmitted by controller 120 to propulsor engine 110.

Controller 120 may be configured to exchange information with propulsor engine 110 at the frequency for the new communication session via communication channel 130. Controller 120 may be configured to exchange information 140 by at least transmitting control signals to propulsor engine 110 to control the operations of propulsor engine 110. For example, controller 120 may be configured to cause propulsor engine 110 to generate more or less propulsion, to increase or decrease rotational speed, power on, or power off. Controller 120 may be configured to control the operation of propulsor engine 110 by controlling the operation of components of propulsor engine 110, such as actuators, starter devices, servos, and so on. Controller 120 may be configured to receive information 140 such as fuel flow level(s), engine temperature(s), engine pressure(s), and maintenance information from propulsor engine 110. Controller 120 may be configured to receive information 140 from components such as sensors, data collection devices, and so on.

In some examples, propulsor engine 110 and controller 120 may exchange information 140 at a frequency during a previous communication session via communication channel 130. Controller 120 may be configured to conclude the previous communication session by powering off propulsor engine 110 after exchanging information 140 during the previous communication session. Controller 120 may be configured to power off propulsor engine 110 by transmitting control signals to propulsor engine 110 and/or actuators in propulsor engine 110 to cause the speed of propulsor engine 110 to reduce to zero. After powering off propulsor engine 110, controller 120 may be configured to power on propulsor engine 110 and establish a new communication session via communication channel 130. Controller 120 may be configured to determine a frequency for the new communication session and exchange information 140 at the new frequency during the new communication session after powering off propulsor engine 110.

Controller 120 may include any suitable arrangement of hardware, software, firmware, or any combination thereof, to perform the techniques attributed to controller 120 herein. Examples of controller 120 include any one or more microprocessors, digital signal processors (DSPs), application specific integrated circuits (ASICs), full authority digital engine control (FADEC) units, engine control units (ECUs), field programmable gate arrays (FPGAs), and/or any other equivalent integrated or discrete logic circuitry, as well as any combinations of such components. When controller 120 includes software or firmware, controller 120 further includes any necessary hardware for storing and executing the software or firmware, such as one or more processors or processing units. In some examples, controller 120 may be integrated with the control unit for propulsor engine 110, which may include a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 120 may include a memory device configured to store data. The memory device may include any volatile or non-volatile media, such as a random access memory (RAM), read only memory (ROM), non-volatile RAM (NVRAM), electrically erasable programmable ROM (EEPROM), flash memory, and the like. In some examples, the memory device may be external to controller 120 (e.g., may be external to a package in which controller 120 is housed).

Communication channel 130 may include a wired connection such as an optical fiber cable and/or a metal wire between propulsor engine 110 and controller 120. In some examples, communication channel 130 may include a controller area network (CAN) bus, an ethernet cord, coaxial cables, digital subscriber line (DSL), and/or any other physical connection. Communication channel 130 may include an optical fiber cable made of silicon, fluoride glass, phosphate glass, chalcogenide glass, and/or sapphire, a copper wire, an aluminum wire, a nickel wire, a steel wire, and/or any other material configured to conduct signals or transfer information 140.

Additionally or alternatively, communication channel 130 may include a wireless connection, such as Bluetooth, infrared, radio frequency (RF), and/or microwave signals, across a medium such as air. Propulsor engine 110 and controller 120 may be configured to establish a wireless connection across communication channel 130 during each communication session by transmitting and receiving wireless signals. When propulsor engine 110 and/or controller 120 are powered off, a wireless component of communication channel 130 may cease to exist until propulsor engine 110 and/or controller 120 are powered on again.

In some examples, a wireless connection between propulsor engine 110 and controller 120 may be susceptible to snooping and/or frequency jamming by nearby devices and systems. An attacker may intentionally or unintentionally interfere with the wireless signals across communication channel 130 in order to disrupt the flow of information 140. System 100 may be especially vulnerable to interference if system 100 is mounted on a vehicle such as an aircraft. The aircraft may travel through areas with varying degrees of electromagnetic interference and noise. Moreover, attackers may specifically target aircraft, especially military aircraft and commercial airliners, to intentionally jam or snoop on wireless communications between propulsor engine 110 and controller 120.

Information 140 may include data encoded in electromagnetic signals and/or optical signals conducted over an optical fiber, a metal wire, and/or a wireless medium such as air. The electromagnetic signals and/or optical signals may encode information 140 using amplitude modulation, frequency modulation, a form of digital modulation, and/or another form of encoding. Information 140 may include control signals transmitted by controller 120 to propulsor engine 110 to control the operations of propulsor engine 110. Information 140 may include data indicating the status of propulsor engine 110 transmitted from propulsor engine 110 to controller 120.

Propulsor engine 110 and controller 120 may be configured to exchange information 140 over communication channel 130 using a protocol or encoding, such as Aeronautical Radio, Incorporated (ARINC) standard 429 or ARINC standard 629, time-triggered ethernet, a CAN protocol, and/or any other suitable protocol. Propulsor engine 110 and controller 120 may be configured to encode information 140 based on the protocol into a bit stream or an analog signal and transmit the signal across communication channel 130. Propulsor engine 110 and controller 120 may also be configured to decode information 140 received from communication channel 130 based on the protocol. In some examples, information 140 may use a digital protocol (e.g., shift-keying) or an analog protocol (e.g., modulation) to encode information 140 in electromagnetic signals and/or optical signals.

In accordance with the techniques of this disclosure, controller 120 may be configured to determine a frequency for a new communication session based on the frequency during a previous communication session. The new frequency may be different than the previous frequency in order to impede snooping, interference, and/or jamming. For example, controller 120 may use an algorithm and/or a random number seed to determine a new frequency, or controller 120 may read a set list of frequencies that is stored to a memory device. In order to establish communication channel 130, each of propulsor engine 110 and controller 120 may be configured to determine the new frequency before exchanging information 140 during the new communication session. For example, propulsor engine 110 and controller 120 may be configured to synchronize the frequencies of their transmissions before exchanging information 140 during the new communication session. In some examples, propulsor engine 110 and/or controller 120 may be configured to scan a predetermined frequency band on communication channel 130 for signals transmitted by propulsor engine 110 or controller 120.

Controller 120 and propulsor engine 110 may use frequency-hopping and/or rolling-code technology to prevent an attacker from observing the exchange of information 140 during a first communication session and snooping on the exchange of information 140 during a later communication session. After the end of a first communication session, controller 120 and propulsor engine 110 may be configured to use the same original seed and the same algorithm, which may include a number generator, to determine a new frequency. Controller 120 and propulsor engine 110 may also be configured to determine more than one frequency in the future in case the other device (e.g., controller 120 or propulsor engine 110) skips a frequency in the algorithm or set list.

As an example, controller 120 may use a seed equal to a value of one to determine a frequency for a first communication session with propulsor engine 110. Controller 120 may share the seed with propulsor engine 110, and both propulsor engine 110 and controller 120 may apply the seed to a pseudorandom number generator and use the generated number to determine a frequency. Equation (1) is one possible equation for determining a frequency based on a pseudo-randomly, or randomly, generated number N between zero and one, wherein $f_{max}$ and $f_{min}$ are the maximum and minimum frequencies of a frequency band. In some examples, controller 120 may be configured to store a set list, where the entries of the set list are values of N for controller 120 to use for communication sessions. Each component of system 100, or each component type of system, may have a predetermined frequency band with a maximum frequency and a minimum frequency. Equation (1) scales or stretches the generated number N, which may have a value between zero and one, to a frequency between the maximum frequency and a minimum frequency.

$$\text{new frequency} = f_{min} + N \times (f_{max} - f_{min}) \quad (1)$$

During the next communication session, controller 120 may be configured to increment the seed to a value of two. Controller 120 may then be configured to apply the new seed to the pseudorandom number generator and use the generated number and Equation (1) to determine a new frequency. In some examples, controller 120 may be configured to determine a new seed based on a method other than incrementing the previous seed. For example, controller 120 may be configured to use Equation (2) to generate a new seed ($k_i$) based on a previous seed ($k_{i-1}$). C is a constant that may be equal to two, three, or any other integer.

$$k_i = (k_{i-1} \times C) - 1 \quad (2)$$

If the new seed is greater than a threshold, controller 120 may be configured to reset the value of the new seed to a predetermined value, such as one, before applying the new seed to the pseudorandom number generator. Controller 120 may also be configured to transmit the new seed to propulsor engine 110 at the beginning of a new communication session using the frequency of the previous communication session. Propulsor engine 110 may be configured to determine the new frequency based on the new seed received from controller 120 and an algorithm that includes the pseudorandom generator and Equation (1). For the remainder of the new communication session, propulsor engine 110 and controller 120 may exchange information at the new frequency. Table I shows seeds, generated numbers, and frequencies for four communication sessions based on a minimum frequency of four hundred megahertz, a maximum frequency of five hundred megahertz, and C equals three.

TABLE I

Four example communication sessions.

| Session | k | N | f (MHz) |
|---|---|---|---|
| 1 | 1 | 0.6818 | 468.18 |
| 2 | 2 | 0.4186 | 441.86 |
| 3 | 5 | 0.3381 | 433.81 |
| 4 | 14 | 0.9248 | 492.48 |

In some examples, controller 120 may be configured to transmit, at the beginning of a new communication session, control signals to propulsor engine 110 at the frequency of a previous communication session. Propulsor engine 110 may be configured to respond to the control signals by transmitting an acknowledgement signal to controller 120. Propulsor engine 110 and controller 120 may then be configured to begin exchanging information 140 during the new communication session at a new frequency based on an algorithm or an established list of frequencies. If controller 120 does not receive an acknowledgement signal from propulsor engine 110, which may occur if propulsor engine 110 transmit an acknowledgement signal at a different frequency, then controller 120 may be configured to set a bit indicating a failure mode. Controller 120 may be configured to set the bit in a status register and report the bit to a diagnostic device through a maintenance port, as explained in further detail below.

Figure 2:
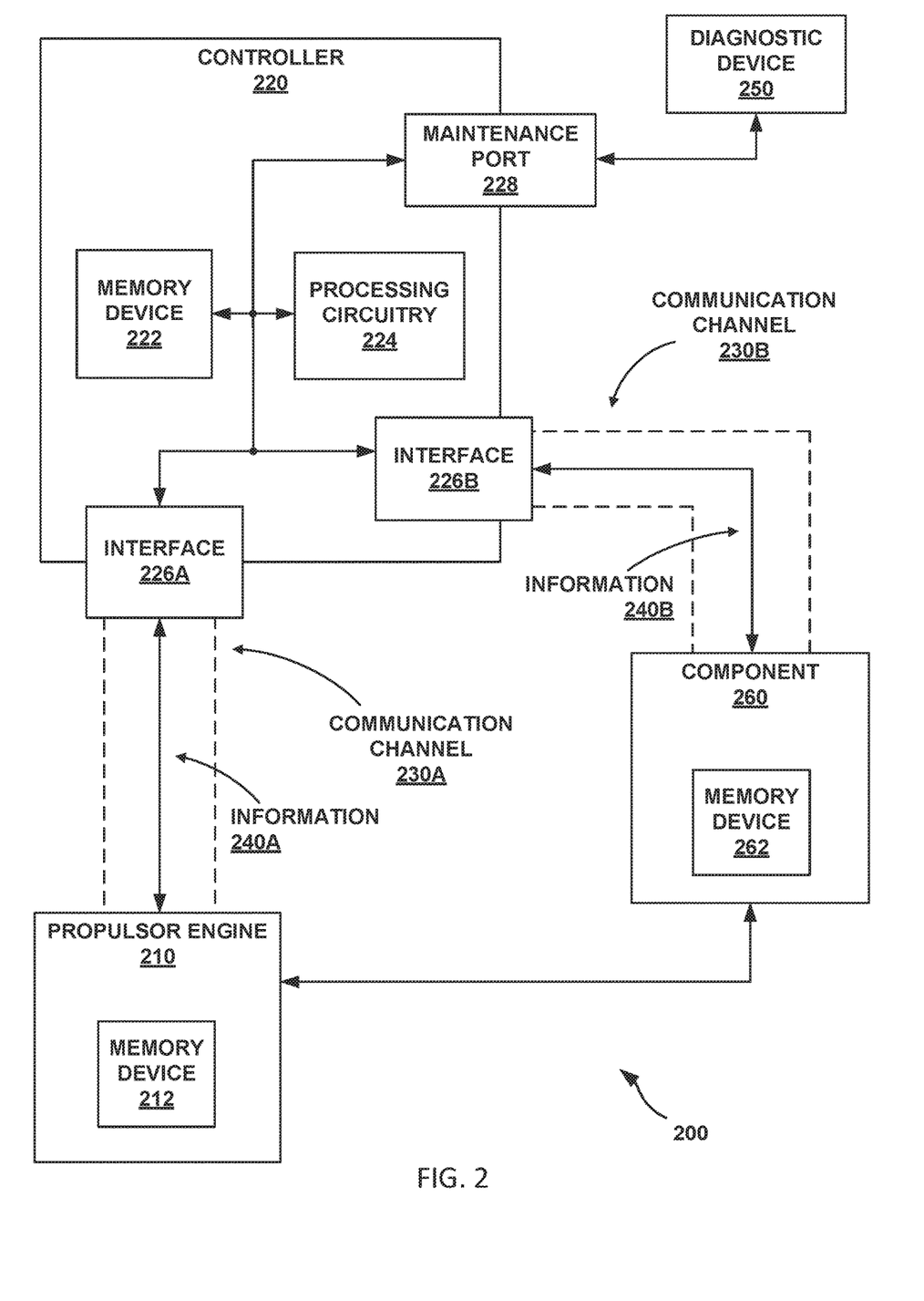
FIG. 2 is a conceptual block diagram illustrating details of an example controller and an example propulsor engine, in accordance with one or more techniques of this disclosure.

FIG. 2 is a conceptual block diagram illustrating details of an example controller 220 and an example propulsor engine 210, in accordance with one or more techniques of this disclosure. Propulsor engine 210 and controller 220 may be configured to exchange information 240A via communication channel 230A and via interface 226A. System 200 may also include diagnostic device 250 configured to receive diagnostic information from controller 220 via maintenance port 228. System 200 also includes 260 configured to exchange information 240B with controller 220 via communication channel 230B and via interface 226B.

Propulsor engine 210 may include a memory device 212, controller 220 may include a memory device 222, and component 260 may include memory device 262. Memory devices 212, 222, and 262 may be configured to store data relating to the performance of propulsor engine 210, such as temperatures, pressures, speeds, fuel flow rates, vibration, other "health" characteristics for prognostic purposes, and the like. Memory devices 212, 222, and 262 may also be configured to store an algorithm for determining a new frequency or a set list of frequencies to cycle through for each communication session. Memory device 222 may be configured to store a master set list for all devices in communication with controller 220 or a separate set list for each device that is in communication with controller 220.

Propulsor engine 210 and/or component 260 may be configured to request a seed (e.g., a number) from controller 220 at the beginning of a communication session. Controller 220 may be configured to transmit a seed to propulsor engine 210 and/or component 260 in response to the request(s). Propulsor engine 210 and/or component 260 may be configured to input the seed into the algorithm to generate a new frequency for the exchange of information 240A and/or 240B.

Propulsor engine 210 may be configured to exchange information 240A with controller 220 during a previous communication session. The previous communication session may end when controller 220 powers off propulsor engine 210. After controller 220 subsequently powers on propulsor engine 210 after powering off propulsor engine 210, propulsor engine 210 may be configured to determine a frequency for a new communication session on communication channel 230A based on the frequency of the previous communication session and an algorithm. In some examples, propulsor engine 210 may be configured to receive a seed number from controller 220 at the beginning of the new communication session at the previous frequency. Propulsor engine 210 may be configured to determine the new frequency based on the seed number and the algorithm, which may include a random or pseudorandom number generator. Propulsor engine 210 may be configured to exchange information 240A with controller 220 at the frequency for the new communication session via communication channel 230A and decode information 240A received from controller 220 based on the frequency for the new communication session. Component 260 may be configured to determine frequencies, exchange information 240B, and decode information 240B in a similar manner to propulsor engine 210.

Interfaces 226A and 226B may include a pin, a lead, an optical port, and/or any other type of interface between controller 220 and communication channels 230A and 230B. Communication channels 230A and 230B may include a wired connection such as an optical fiber cable and/or a metal wire between propulsor engine 210 and controller 220. In some examples, communication channels 230A and 230B may include a pad or trace on a printed circuit board (PCB), and interfaces 226A and 226B may include a pin that is configured to be soldered to the pad or trace. In some examples, interfaces 226A and 226B may include a laser, a light emitting diode (LED), a photodiode, a photoresistor, and/or photo-acceptance unit configured to convert between electrical signals and optical signals. In some examples, interfaces 226A and 226B may include an antenna configured to transmit and/or receive wireless electromagnetic signals.

Processing circuitry 224 may include integrated circuitry with digital logic or analog circuitry configured to determine a frequency for a new communication session on communication channel 230A or 230B based on a frequency of a previous communication session. Processing circuitry 224 may be configured to encode information 240A in the frequency for the current communication session over communication channel 230A. Processing circuitry 224 may also be configured to encode information 240B in the frequency for the current communication session over communication channel 230B. Processing circuitry 224 may be configured to determine new frequencies based on previous frequencies and an algorithm, a set list, a random number seed, and/or any other method of determining a new frequency. In some examples, processing circuitry 224 may be configured to determine a seed at the start of a new communication session and transmit the seed to the follower device (i.e., propulsor engine 210 or component 260).

Diagnostic device 250 may be configured to receive diagnostic information from maintenance port 228 of controller 220 by at least transmitting a request for diagnostic information to controller 220. The diagnostic information may indicate the operations of propulsor engine 210 and controller 220. A maintenance worker may use diagnostic device 250 to troubleshoot issues with propulsor engine 210 and download data. The data may include communication faults, failure mode bits, and/or other status bits and status information regarding the operation of propulsor engine 210 and/or component 260. The maintenance worker may also use diagnostic device 250 to test the performance of propulsor engine 210 and/or controller 220.

The request received by maintenance port 228 from diagnostic device 250 for diagnostic information may include a passcode, such as a four-digit number. An authorized maintenance worker may operate diagnostic device 250, or an attacker may operate diagnostic device 250 to snoop on or hack into controller 220. Controller 220 may be configured to receive the request for diagnostic information from diagnostic device 250, where the diagnostic information indicates the operations of propulsor engine 210. Controller 220 may be further configured to confirm that the passcode in the request matches a security code for controller 220 that may be stored in memory device 222. Controller 220 may be configured to transmit the requested diagnostic information through maintenance port 228 to diagnostic device 250 in response to confirming that the passcode matches the security code.

An attacker may use diagnostic device to snoop on the operations of propulsor engine 210 and/or controller 220. If the attacker sends a request with an incorrect passcode from diagnostic device 250 to maintenance port 228, controller 220 may be configured to reject the request in response to determining that the passcode in the request does not match the security code. Controller 220 may be configured to set a bit indicating unauthorized access attempts in response to receiving a threshold number of consecutive requests with incorrect passcodes or a threshold number of requests in a threshold time duration.

Component 260 may include a component that controls the operation of propulsor engine 210 (i.e., a controlling component), such as an actuator or a servo. Additionally or alternatively, component 260 may include a sensor or a data collection device, which may be referred to as "non-controlling components." Component 260 may be positioned inside propulsor engine 210 (i.e., an internal component) and/or positioned outside propulsor engine 210 (i.e., an external component or auxiliary component). A sensor may be configured to sense various parameters of the operation of propulsor engine 210, such as a temperature, a pressure, a speed, a movement or a deflection, and/or any other parameters of system 200 and/or propulsor engine 210. Controller 220 may be configured to monitor the performance of propulsor engine 210 based on information 240B received from a sensor or data collection device. A data collection device may be configured to measure or track the performance of propulsor engine 210 by counting the times that the performance exceeds or fails to meet a threshold. A data collection device may include a camera configured to collect images of propulsor engine 210.

An actuator may be configured to move a part of system 200 and/or propulsor engine 210, such as a piston, a transmission, a gearbox, valves such as air bleed valves, and/or any other part of system 200. In some examples, an actuator of component 260 may be configured to change the geometry of propulsor engine 210 by moving the vanes of a compressor or a turbine of propulsor engine 210. An actuator of component 260 may be configured to change a nozzle exhaust area and/or control the flow of fuel by fluid servo valve actuation.

Component 260 may communicate with controller 220 via communication channel 230B within a predetermined frequency band, where the predetermined frequency band is particular to each component 260 or to each component type. For example, if component 260 includes a sensor type component, controller 220 may be configured to determine a frequency for a new communication session to exchange information 240B with the sensor in a predetermined frequency band ranging from three hundred megahertz to four hundred megahertz. Whereas, if component 260 includes an actuator type component, controller 220 may be configured to determine a frequency for a new communication session to exchange information 240B with the actuator in a predetermined frequency band ranging from six megahertz to seven megahertz. Controller 220 may also be configured to determine the frequency for a communication session with propulsor engine 210 in a predetermined frequency band.

Component 260 may be configured to determine a frequency for a new communication session on communication channel 230B based on a frequency of a previous communication session and an algorithm or set list stored to memory device 262. In some examples, component 260 may be configured to scan a predetermined frequency band for control signals transmitted by controller 220 to component 260. In response to component 260 receiving information 240B from controller 220 at the beginning of a communication session, component 260 may be configured to transmit an acknowledgement signal to controller 220. Controller 220 may be configured to set a bit in memory device 222 to indicate a failure mode in response to not receiving the acknowledgement signal from component 260. In some examples, controller 220 may be configured to set a timer at the beginning of a communication session. If the timer expires before controller 220 receives an acknowledgement signal from component 260 or propulsor engine 210, controller 220 may be configured to set a bit in memory device 222 to indicate a failure mode for the respective device that failed to acknowledge communications.

Component 260 may be configured to exchange information 240B with controller 220 at a first frequency during a previous communication session. Component 260 may be configured to determine a second frequency for a new communication session on communication channel 230B based on the first frequency and an algorithm and/or a set list stored to memory device 262. Component 260 may be configured to exchange information 240B with controller 220 at the second frequency via communication channel 230B and decode information 240B received from controller 220 based on the second frequency for the new communication session.

Figure 3:
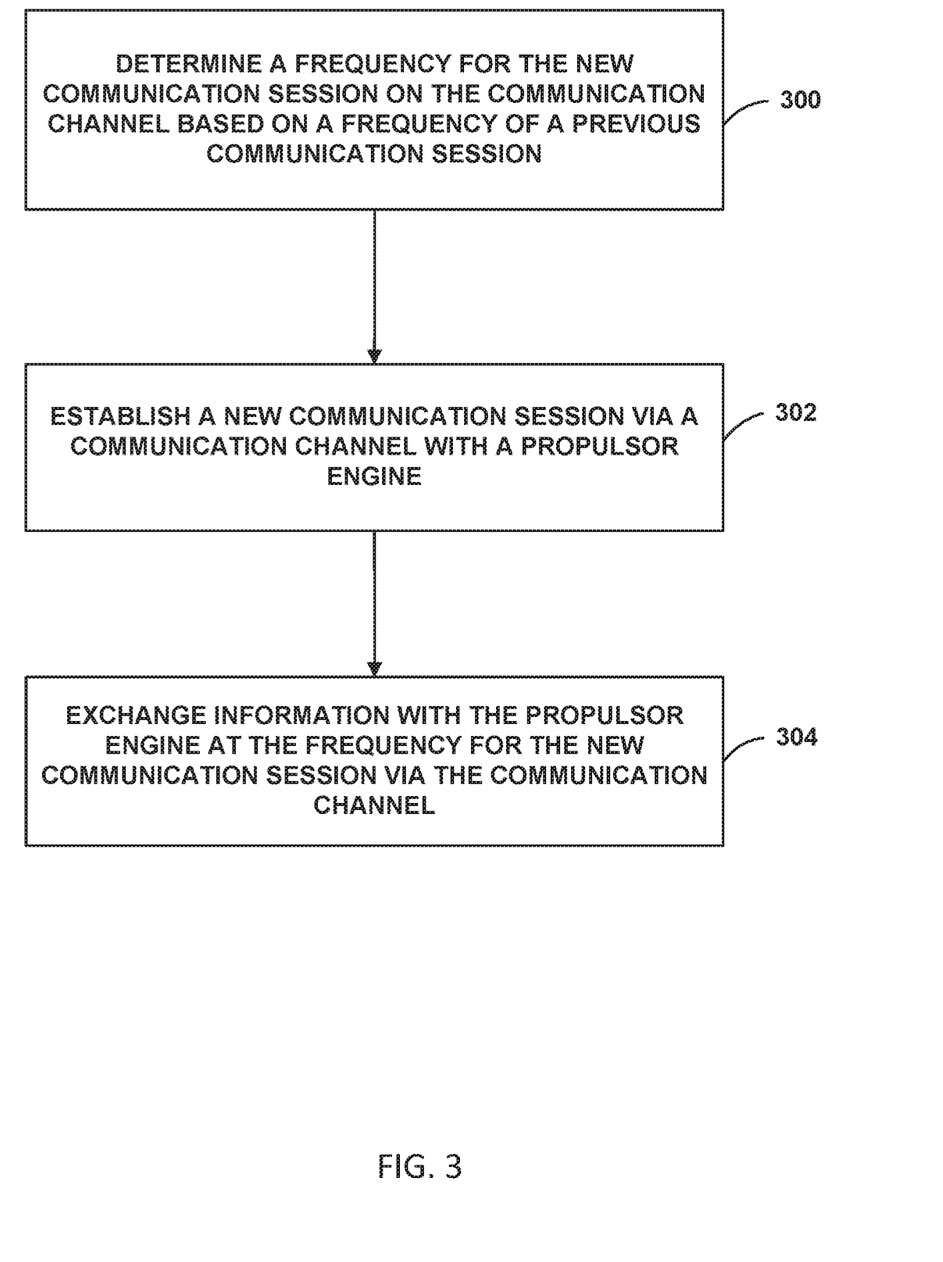
FIG. 3 is a flowchart illustrating an example process implemented by a controller to control the operations of a propulsor engine, in accordance with one or more techniques of this disclosure.

FIG. 3 is a flowchart illustrating an example process implemented by a controller to control the operation of a propulsor engine, in accordance with one or more techniques of this disclosure. Operations 302-306 are described in the context of system 100 and controller 120 of FIG. 1, although other controllers, such as controller 220 of FIG. 2 may perform similar operations.

In the example of FIG. 3, controller 120 determines a frequency for the new communication session on communication channel 130 based on a frequency of a previous communication session (300). The frequency for the new communication session may be different than the frequency of the previous communication session. For example, controller 120 may be configured to determine the frequency for the new communication session based on the previous frequency and an algorithm or a set list. In some examples, controller 120 may be configured to choose a seed and determine the new frequency based on the previous frequency and/or the previous seed. In some examples, controller 120 may be configured to transmit the seed to propulsor engine 110 at the beginning of the new communication session using the previous seed. Propulsor engine 110 may be configured to independently determine the new frequency based on the seed and the algorithm, which may be stored to a memory device in propulsor engine 110.

In the example of FIG. 3, controller 120 establishes a new communication session via communication channel 130 with propulsor engine 110 (302). In some examples, controller 120 may be configured to establish a new communication session when propulsor engine 110 powers on. In some examples, controller 120 may be configured to power on propulsor engine 110 by controlling a starting device to initiate the operation of propulsor engine 110. Controller 120 may be configured to initiate the new communication session at a new frequency determined by controller 120. In some examples, controller may be configured to transmit signals at the frequency of a previous communication session at the beginning of the new communication session before determining a new frequency. Controller 120 may also be configured to terminate or conclude the new communication session when propulsor engine 110 powers off.

In the example of FIG. 3, controller 120 exchanges information 140 with propulsor engine 110 at the frequency for the new communication session via communication channel 130 (306). Controller 120 may be configured to exchange information 140 by at least transmitting control signals to propulsor engine 110 to control the operations of propulsor engine 110. For example, controller 120 may be configured to cause propulsor engine 110 to generate more or less propulsion, to increase or decrease rotational speed, power on, or power off. Controller 120 may be configured to receive information 140 such as fuel flow level(s), engine temperature(s), engine pressure(s), and maintenance information from propulsor engine 110.

FIG. 3 has described the operation of controller 120 and system 100 in general. In some examples, system 100 may include one or more components configured to sense various parameters of the operations of propulsor engine 110 and/or move a part of propulsor engine 110. Controller 120 may be configured to establish a new communication session with each component when propulsor engine 110 powers on. Controller 120 may be configured to determine a unique new frequency for each component based on a unique algorithm or unique set list of frequencies.

In some examples, the devices of system 100 may be configured to operate in a default communication state in case of a system failure. One or more non-responsive devices may result in a shutdown of system 100, unless controller 120 is able to establish a communication channel with the non-responsive device(s). Propulsor engine 110, controller 120, and/or any other device(s) may be configured to communicate using a backup frequency in the case of a communication failure. The backup frequency may be a default frequency for the particular non-responsive device or, alternatively, the last frequency at which controller 120 successfully communicated with the non-responsive device.

In some examples, controller 120 may be configured to determine a frequency for a future communication session on communication channel 130 and any other communication channels based on a frequency of a current communication session. Controller 120 may be configured to determine the frequency for the future communication session before propulsor engine 110 is powered off to end the current communication session. Controller 120 may be configured to communicate the frequency for the future communication session to the respective device before propulsor engine 110 is powered off. Each device may be configured to store the frequency for the future communication session and begin operating at the frequency for the future communication session when propulsor engine 110 powers on.

Figure 4:
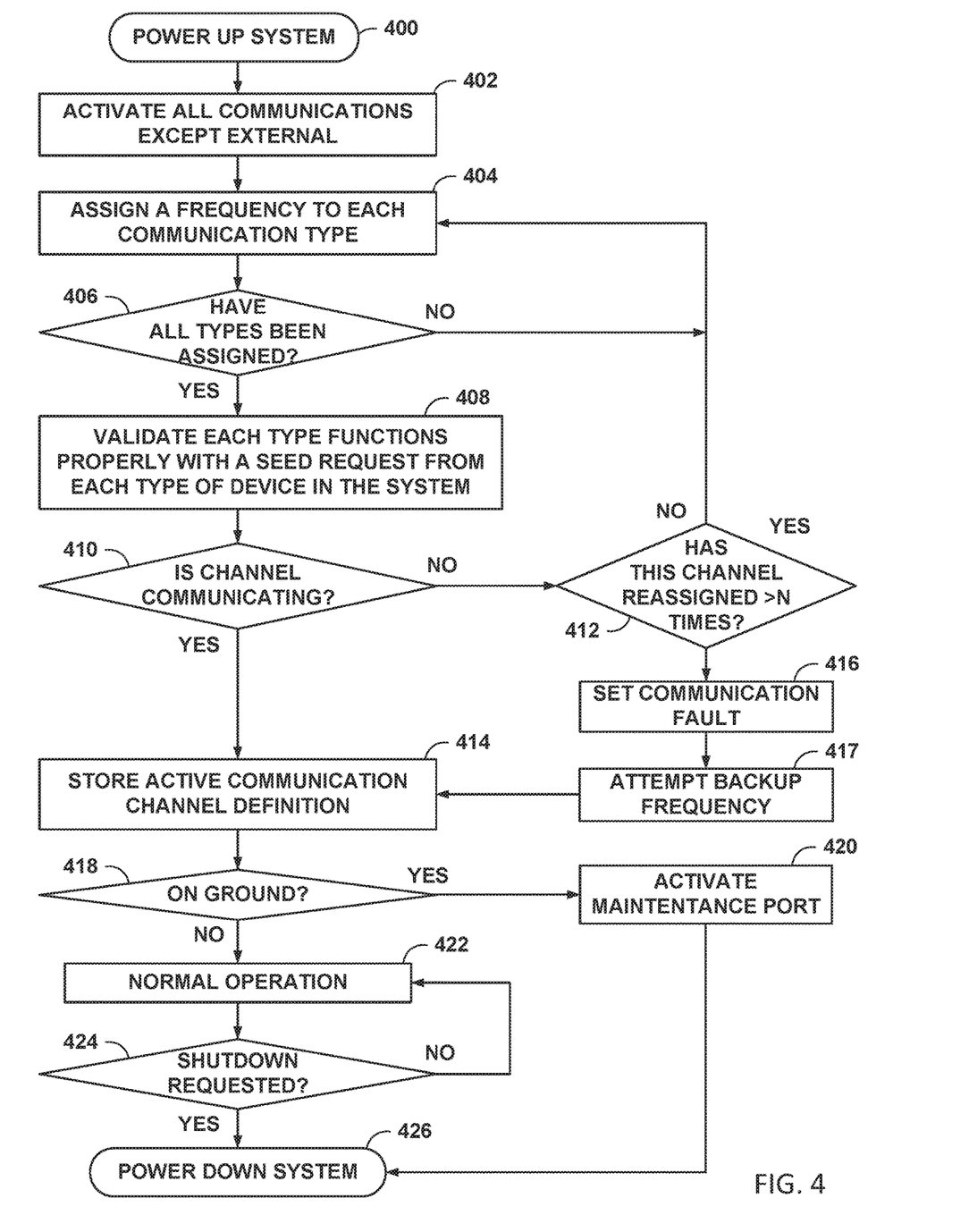
FIG. 4 is a flowchart illustrating an example process implemented by a controller for communicating with a propulsor engine and/or one or more components of the propulsor engine, in accordance with one or more techniques of this disclosure.

FIG. 4 is a flowchart illustrating an example process implemented by a controller for communicating with a propulsor engine and/or one or more components of the propulsor engine, in accordance with one or more techniques of this disclosure. Operations 400-426 are described in the context of system 200 and controller 220 of FIG. 2, although other controllers, such as controller 120 of FIG. 1, may perform similar operations.

In the example of FIG. 4, controller 220 may power up system 200 including propulsor engine 210 (400). Controller 220 may be configured to transmit control signals to a starter device to power up propulsor engine 210. In the example of FIG. 4, controller 220 may activate all communications in system 200 except external communications (402). Controller 220 may activate communications with propulsor engine 210 and component 260 by transmitting signals at the frequency of the previous communication session, which may have concluded the last time that propulsor engine 210 was powered down.

In the example of FIG. 4, controller 220 may assign a frequency to each communication type (404). For example, controller 220 may be configured to assign a first frequency for communication channel 230A based on a previous frequency for communication channel 230A and assign a second frequency for communication channel 230B based on a previous frequency for communication channel 230B. In the example of FIG. 4, controller 220 may determine that all communication types have not been assigned a frequency (406) and continue to assign frequencies.

In response to determining that all communication types have been assigned a frequency, controller 220 may validate that communication type functions properly with a seed request from each type of device or component (e.g., propulsor engine 210 and component 260) in system 200 (408).

In some examples, controller 220 may receive seed requests from propulsor engine 210 and component 260 and may be configured to respond by transmitting seeds to propulsor engine 210 and component 260. Propulsor engine 210 and component 260 may use the seeds to determine a new frequency based on an algorithm stored to memory device 212 and 262.

In the example of FIG. 4, if controller 220 determines that communication channel 230A is not communicating and has been reassigned three or fewer times, controller 220 may assign another frequency to communication channel 230A (410, 412, and 404). If controller 220 determines that communication channel 230B is not communicating and has been reassigned more than N times, controller 220 may set a communication fault for communication channel 230B (410, 412, and 416). In some examples, N may be any integer, such as three, serving as a threshold number of times to reassign the frequency for communication channel 230A. The communication fault may be a bit in a status register that controller 220 may be configured to transmit to diagnostic device 250 in response to a request for diagnostic information. After setting the communication fault, controller 220 may attempt to communicate with propulsor engine 210 using a backup frequency (417). The backup frequency may be a default frequency for propulsor engine 210 or the last frequency at which controller 220 successfully communicated with propulsor engine 210.

If, in the example of FIG. 4, controller 220 determines that communication channel 230A is communicating, controller 220 may store a definition of the active communication channel (e.g., communication channel 230A) (410 and 414). The definition may include the established frequency for communication channel 230A.

In the example of FIG. 4, controller 220 may determine that system 200 is on the ground and, in response, activate maintenance port 228 (418 and 420). If system 200 includes a vehicle as such as aircraft, authorized personnel may perform maintenance on system 200 while on the ground. Controller 220 may determine that system 200 is not on the ground and, in response, configure system 200 for normal operation (418 and 422). In normal operation, propulsor engine 210 may be configured to generate propulsion for system 200, and component 260 may be configured to sense the operation of propulsor engine 210 or move a part of propulsor engine 210.

In the example of FIG. 4, controller 220 may determine that shutdown has not been requested and, in response, continue normal operation (424 and 422). If controller 220 determines that shutdown has been requested or if controller 220 has activated maintenance port 228, controller 220 may power down system 200 (424, 420, and 426). Controller 220 may be configured to power down system 200 by reducing the speed of propulsor engine 210 to zero and turning off component 260.

The following numbered examples demonstrate one or more aspects of the disclosure.

EXAMPLE 1

A system includes a propulsor engine and a controller configured to determine a frequency for a new communication session on a communication channel based on a frequency of a previous communication session, wherein the frequency for the new communication session is different than the frequency of the previous communication session. The controller is further configured to establish the new communication session via the communication channel with the propulsor engine. The controller is also configured to exchange information with the propulsor engine at the frequency for the new communication session via the communication channel.

EXAMPLE 2

The system of example 1, wherein the controller is further configured to exchange information with the propulsor engine during the previous communication session via the communication channel and power off the propulsor engine after exchanging information with the propulsor engine during the previous communication session. The controller is also configured to power on the propulsor engine after powering off the propulsor engine, wherein the controller is configured to exchange information with the propulsor engine at the frequency for the new communication session via the communication channel after powering on the propulsor engine and after determining the frequency for the new communication session.

EXAMPLE 3

The system of examples 1-2 or any combination thereof, wherein the controller is configured to determine the frequency for the new communication session based on an algorithm that includes determining a seed for the new communication session based on a seed for the previous communication session. The algorithm also includes applying the seed for the new communication session to a random number generator or a pseudorandom number generator to generate a number for the new communication session based on the seed for the new communication session. The algorithm further includes determining the frequency for the new communication session by scaling the number for the new communication session to a number between a minimum frequency and a maximum frequency of a predetermined frequency band.

EXAMPLE 4

The system of examples 1-3 or any combination thereof, wherein the propulsor engine is configured to exchange information with the controller during the previous communication session. The controller is also configured to determine a frequency for the new communication session on the communication channel based on the frequency of the previous communication session and the algorithm. The controller is configured to exchange information with the controller at the frequency for the new communication session via the communication channel and decode information received from the controller based on the frequency for the new communication session.

EXAMPLE 5

The system of examples 1-4 or any combination thereof, wherein the propulsor engine is configured to transmit an acknowledgement signal to the controller in response to receiving information from the controller. The controller is further configured to set a bit indicating a failure mode in response to not receiving the acknowledgement signal from the propulsor engine.

EXAMPLE 6

The system of examples 1-5 or any combination thereof, wherein the controller is configured to determine the frequency for the new communication session within a predetermined frequency band. The controller is also configured to transmit control signals to the propulsor engine at the frequency for the new communication session via the communication channel, wherein the propulsor engine is further configured to scan the predetermined frequency band for control signals transmitted by the controller to the propulsor engine.

EXAMPLE 7

The system of examples 1-6 or any combination thereof, wherein the communication channel includes a cable including an optical fiber cable or a metal wire, wherein the controller is configured to exchange information with the propulsor engine at the frequency for the new communication session via the cable.

EXAMPLE 8

The system of examples 1-7 or any combination thereof, wherein the controller is configured to exchange information with the propulsor engine using a communication protocol.

EXAMPLE 9

The system of examples 1-8 or any combination thereof, wherein the new communication session is a first new communication session, wherein the previous communication session is a first previous communication session, wherein the communication channel is a first communication channel, and wherein the system further includes a component. The controller is further configured to determine a frequency for a second new communication session on a second communication channel based on a frequency of a second previous communication session, wherein the frequency for the second new communication session is different than the frequency of the second previous communication session. The controller is also configured to establish the second new communication session via the second communication channel with the component and exchange information with the component at the frequency for the second new communication session via the second communication channel.

EXAMPLE 10

The system of examples 1-9 or any combination thereof, wherein the controller is configured to determine the frequency for the first new communication session within a first frequency band, wherein the controller is configured to determine the frequency for the second new communication session within a second frequency band, wherein the first frequency band and the second frequency band are different, and wherein the second frequency band is particular to a type of the component.

EXAMPLE 11

The system of examples 1-10 or any combination thereof, wherein the component includes a sensor configured to sense the operation of the propulsor engine, and wherein the controller is configured to determine the frequency for the second new communication session within a frequency band ranging from three hundred megahertz to four hundred megahertz.

EXAMPLE 12

The system of examples 1-11 or any combination thereof, wherein the component includes an actuator configured to move a part of the propulsor engine, and wherein the controller is configured to determine the frequency for the second new communication session within a frequency band ranging from six megahertz to seven megahertz.

EXAMPLE 13

The system of examples 1-12 or any combination thereof, wherein the controller is configured to determine the frequency for the new communication session based on an algorithm and a seed number, wherein the controller is further configured to transmit the seed number to the propulsor engine at the frequency of the previous communication session, and wherein the propulsor engine is configured to determine the frequency for the new communication session based on the algorithm and the seed number.

EXAMPLE 14

The system of examples 1-13 or any combination thereof, further including a diagnostic device configured to receive diagnostic information from a maintenance port of the controller, wherein the controller is configured to receive a request for diagnostic information from the diagnostic device, wherein the request includes a passcode. The controller is also configured to confirm that the passcode matches a security code for the controller and transmit the diagnostic information through the maintenance port to the diagnostic device in response to confirming that the passcode matches the security code, wherein the diagnostic information indicates operation of the propulsor engine.

EXAMPLE 15

A method includes determining a frequency for a new communication session on a communication channel based on a frequency of a previous communication session, wherein the frequency for the new communication session is different than the frequency of the previous communication session. The method further includes establishing the new communication session via the communication channel with a propulsor engine. The method also includes exchanging information with the propulsor engine at the frequency for the new communication session via the communication channel.

EXAMPLE 16

The method of example 15, further including exchanging information with the propulsor engine during the previous communication session via the communication channel. The method also includes powering off the propulsor engine after exchanging information with the propulsor engine during the previous communication session and powering on the propulsor engine after powering off the propulsor engine, wherein exchanging information with the propulsor engine at the frequency for the new communication session includes exchanging information with the propulsor engine at the frequency for the new communication session after powering on the propulsor engine and after determining the frequency for the new communication session.

EXAMPLE 17

The method of examples 15-16 or any combination thereof, further including transmitting information to the propulsor engine at the frequency for the new communication session via the communication channel. The method also includes not receiving an acknowledgement signal from the propulsor engine after transmitting information to the propulsor engine at the frequency for the new communication session and setting a bit indicating failure mode in response to not receiving the acknowledgement signal from the propulsor engine.

EXAMPLE 18

The method of examples 15-17 or any combination thereof, wherein exchanging information with the propulsor engine via the communication channel includes exchanging information with the propulsor engine via an optical fiber cable or a metal wire.

EXAMPLE 19

The method of examples 15-18 or any combination thereof, wherein the new communication session is a first new communication session, wherein the communication channel is the first communication channel, wherein the previous communication session is a first previous communication session. The method further includes determining a frequency for a second new communication session on a second communication channel based on a frequency of a second previous communication session, wherein the frequency for the second new communication session is different than the frequency of the second previous communication session. The method also includes establishing the second new communication session via the second communication channel with a component and exchanging information with the component at the frequency for the second new communication session via the second communication channel.

EXAMPLE 20

The method of examples 15-19 or any combination thereof, wherein exchanging information with the component auxiliary device at the frequency for the second new communication session includes causing a sensor to sense monitor operation of the propulsor engine. Determining the frequency for the second new communication session includes determining the frequency for the second new communication session within a first frequency band ranging from three hundred megahertz to four hundred megahertz.

EXAMPLE 21

The method of examples 15-20 or any combination thereof, wherein exchanging information with the component auxiliary device at the frequency for the second new communication session includes causing an actuator to move a part of the engine. Determining the frequency for the second new communication session includes determining the frequency for the second new communication session within a second frequency band ranging from six megahertz to seven megahertz.

EXAMPLE 22

A system includes a propulsor engine, a component, and a controller configured to exchange information with the propulsor engine during a first previous communication session via a first communication channel. The controller is further configured to exchange information with the component during a second previous communication session via a second communication channel. The controller is also configured to power off the propulsor engine after exchanging information with the propulsor engine during the first previous communication session and after exchanging information with the component during the second previous communication session. The controller is configured to power on the propulsor engine after powering off the propulsor engine and determine a frequency for the first new communication session on the first communication channel based on a frequency of a first previous communication session, wherein the frequency for the first new communication session is different than the frequency of the first previous communication session. The controller is further configured to determine a frequency for the second new communication session on the second communication channel based on a frequency of a second previous communication session, wherein the frequency for the second new communication session is different than the frequency of the second previous communication session. The controller is also configured to exchange information with the propulsor engine at the frequency for the first new communication session via the first communication channel and exchange information with the component at the frequency for the second new communication session via the second communication channel.

EXAMPLE 23

The system of example 22, wherein the controller is configured to determine the frequency for the first new communication session within a predetermined frequency band and transmit control signals to the propulsor engine at the frequency for the first new communication session via the first communication channel. The propulsor engine is further configured to scan the predetermined frequency band for control signals transmitted by the controller to the propulsor engine.

Various examples have been described. These and other examples are within the scope of the following claims.

What is claimed is:
1. A system comprising:
a propulsor engine; and
a controller configured to:
  determine a second seed for a new communication session on a communication channel, wherein the controller is configured to determine the second seed based on a first seed for a previous communication session;
  determine a frequency for the new communication session on the communication channel based on the second seed, wherein the frequency for the new communication session is different than a frequency of the previous communication session;
  transmit the second seed to the propulsor engine at the frequency of the previous communication session;
  establish the new communication session via the communication channel with the propulsor engine; and
  exchange information with the propulsor engine at the frequency for the new communication session via the communication channel,
wherein the propulsor engine is configured to determine the frequency for the new communication session based on the second seed.

2. The system of claim 1, wherein the controller is further configured to:
    exchange information with the propulsor engine during the previous communication session via the communication channel;
    power off the propulsor engine after exchanging information with the propulsor engine during the previous communication session; and
    power on the propulsor engine after powering off the propulsor engine,
    wherein the controller is configured to exchange information with the propulsor engine at the frequency for the new communication session via the communication channel after powering on the propulsor engine and after determining the frequency for the new communication session.

3. The system of claim 1, wherein the controller is configured to:
    apply the second seed to a random number generator or a pseudorandom number generator to generate a number for the new communication session based on the second seed; and
    determining the frequency for the new communication session by scaling the number for the new communication session to a number between a minimum frequency and a maximum frequency of a predetermined frequency band.

4. The system of claim 3, wherein the propulsor engine is configured to:
    exchange information with the controller during the previous communication session;
    determine a frequency for the new communication session on the communication channel based on the second seed;
    exchange information with the controller at the frequency for the new communication session via the communication channel; and
    decode information received from the controller based on the frequency for the new communication session.

5. The system of claim 1,
    wherein the propulsor engine is configured to transmit an acknowledgement signal to the controller in response to receiving information from the controller, and
    wherein the controller is further configured to set a bit indicating a failure mode in response to not receiving the acknowledgement signal from the propulsor engine.

6. The system of claim 1, wherein the controller is configured to:
    determine the frequency for the new communication session within a predetermined frequency band; and
    transmit control signals to the propulsor engine at the frequency for the new communication session via the communication channel,
    wherein the propulsor engine is further configured to scan the predetermined frequency band for control signals transmitted by the controller to the propulsor engine.

7. The system of claim 1, wherein the communication channel comprises a cable including an optical fiber cable or a metal wire, wherein the controller is configured to exchange information with the propulsor engine at the frequency for the new communication session via the cable.

8. The system of claim 7, wherein the controller is configured to exchange information with the propulsor engine using a communication protocol.

9. The system of claim 1,
    wherein the new communication session is a first new communication session,
    wherein the previous communication session is a first previous communication session,
    wherein the communication channel is a first communication channel,
    wherein the system further comprises a component, and
    wherein the controller is further configured to:
        determine a frequency for a second new communication session on a second communication channel based on a frequency of a second previous communication session, wherein the frequency for the second new communication session is different than the frequency of the second previous communication session;
        establish the second new communication session via the second communication channel with the component; and
        exchange information with the component at the frequency for the second new communication session via the second communication channel.

10. The system of claim 9,
    wherein the controller is configured to determine the frequency for the first new communication session within a first frequency band,
    wherein the controller is configured to determine the frequency for the second new communication session within a second frequency band,
    wherein the first frequency band and the second frequency band are different, and
    wherein the second frequency band is particular to a type of the component.

11. The system of claim 9,
    wherein the component includes a sensor configured to sense the operation of the propulsor engine, and
    wherein the controller is configured to determine the frequency for the second new communication session within a frequency band ranging from three hundred megahertz to four hundred megahertz.

12. The system of claim 9,
    wherein the component includes an actuator configured to move a part of the propulsor engine, and
    wherein the controller is configured to determine the frequency for the second new communication session within a frequency band ranging from six megahertz to seven megahertz.

13. The system of claim 1, further comprising a diagnostic device configured to receive diagnostic information from a maintenance port of the controller, wherein the controller is configured to:
    receive a request for diagnostic information from the diagnostic device, wherein the request includes a passcode;
    confirm that the passcode matches a security code for the controller; and
    transmit the diagnostic information through the maintenance port to the diagnostic device in response to confirming that the passcode matches the security code, wherein the diagnostic information indicates operation of the propulsor engine.

14. A method comprising:
    determining, by a controller, a second seed for a new communication session on a communication channel by determining the second seed based on a first seed for a previous communication channel;
    determining, by the controller, a frequency for the new communication session on the communication channel based on the second seed, wherein the frequency for the new communication session is different than a frequency of the previous communication session;
transmitting, by the controller, the second seed to a propulsor engine at the frequency of the previous communication session;
establishing, by the controller, the new communication session via the communication channel with the propulsor engine;
determining, by the propulsor engine, the frequency for the new communication session based on the second seed; and
exchanging, by the controller and the propulsor engine, information with the propulsor engine at the frequency for the new communication session via the communication channel.

15. The method of claim 14, further comprising:
exchanging information with the propulsor engine during the previous communication session via the communication channel;
powering off the propulsor engine after exchanging information with the propulsor engine during the previous communication session; and
powering on the propulsor engine after powering off the propulsor engine,
wherein exchanging information with the propulsor engine at the frequency for the new communication session comprises exchanging information with the propulsor engine at the frequency for the new communication session after powering on the propulsor engine and after determining the frequency for the new communication session.

16. The method of claim 14, further comprising:
transmitting information to the propulsor engine at the frequency for the new communication session via the communication channel;
not receiving an acknowledgement signal from the propulsor engine after transmitting information to the propulsor engine at the frequency for the new communication session; and
setting a bit indicating failure mode in response to not receiving the acknowledgement signal from the propulsor engine.

17. The method of claim 14,
wherein the new communication session is a first new communication session,
wherein the communication channel is the first communication channel,
wherein the previous communication session is a first previous communication session, and
wherein the method further comprises:
  determining a frequency for a second new communication session on a second communication channel based on a frequency of a second previous communication session, wherein the frequency for the second new communication session is different than the frequency of the second previous communication session;
  establishing the second new communication session via the second communication channel with a component; and
  exchanging information with the component at the frequency for the second new communication session via the second communication channel.

18. The method of claim 14, further comprising:
receiving a request for diagnostic information from a diagnostic device, wherein the request includes a passcode;
confirming that the passcode matches a security code for the controller; and
transmitting the diagnostic information through a maintenance port to the diagnostic device in response to confirming that the passcode matches the security code, wherein the diagnostic information indicates operation of the propulsor engine.

19. A system comprising:
a propulsor engine;
a component; and
a controller configured to:
  exchange information with the propulsor engine during a first previous communication session via a first communication channel;
  exchange information with the component during a second previous communication session via a second communication channel;
  power off the propulsor engine after exchanging information with the propulsor engine during the first previous communication session and after exchanging information with the component during the second previous communication session;
  power on the propulsor engine after powering off the propulsor engine;
  determine a second seed for a first new communication session on the first communication channel, wherein the controller is configured to determine the second seed based on a first seed for the first previous communication session;
  determine a frequency for the first new communication session on the first communication channel based on the second seed, wherein the frequency for the first new communication session is different than the frequency of the first previous communication session;
  determine a fourth seed for a second new communication session on the second communication channel, wherein the controller is configured to determine the fourth seed based on a third seed for the second previous communication session;
  determine a frequency for the second new communication session on the second communication channel based on the fourth seed, wherein the frequency for the second new communication session is different than the frequency of the second previous communication session;
  transmit the second seed to the propulsor engine at the frequency of the first previous communication session;
  transmit the fourth seed to the component at the frequency of the second previous communication session;
  exchange information with the propulsor engine at the frequency for the first new communication session via the first communication channel; and
  exchange information with the component at the frequency for the second new communication session via the second communication channel.

20. The system of claim 19, wherein the controller is configured to:
determine the frequency for the first new communication session within a predetermined frequency band; and
transmit control signals to the propulsor engine at the frequency for the first new communication session via the first communication channel, wherein the propulsor engine is further configured to scan the predetermined frequency band for control signals transmitted by the controller to the propulsor engine.

\* \* \* \* \*